US006671426B2

(12) United States Patent
Litvin (10) Patent No.: US 6,671,426 B2
(45) Date of Patent: Dec. 30, 2003

(54) MONOLITHIC INTEGRATED TERAHERTZ OPTICAL ASYMMETRIC DEMULTIPLEXER

(75) Inventor: Kerry I. Litvin, Huntingdon Valley, PA (US)

(73) Assignee: General Instrument Corporation, Horsham, PA (US)

(*) Notice: Subject to any disclaimer, the term of this patent is extended or adjusted under 35 U.S.C. 154(b) by 229 days.

(21) Appl. No.: 09/811,758

(22) Filed: Mar. 19, 2001

(65) Prior Publication Data

US 2003/0219193 A1 Nov. 27, 2003

(51) Int. Cl.[7] ............................. G02B 6/43; G01B 9/02
(52) U.S. Cl. ............................. 385/15; 356/483
(58) Field of Search ........................... 385/15; 356/477, 356/483; 359/128, 139–140, 299, 320

(56) References Cited

U.S. PATENT DOCUMENTS

| | | | | |
|---|---|---|---|---|
| 4,962,987 A | * | 10/1990 | Doran | 359/108 |
| 4,973,122 A | * | 11/1990 | Cotter et al. | 385/50 |
| 5,060,305 A | | 10/1991 | Prucnal et al. | |
| 5,073,980 A | | 12/1991 | Prucnal et al. | |
| 5,144,375 A | * | 9/1992 | Gabriel et al. | 359/320 |
| 5,274,720 A | * | 12/1993 | Yamamoto | 385/129 |
| 5,493,433 A | | 2/1996 | Prucnal et al. | |
| 5,742,415 A | * | 4/1998 | Manning et al. | 359/128 |
| 5,825,519 A | | 10/1998 | Prucnal | |
| 5,841,560 A | | 11/1998 | Prucnal | |
| 5,903,691 A | * | 5/1999 | Wisseman et al. | 385/37 |
| 5,917,979 A | | 6/1999 | Prucnal | |
| 5,926,496 A | * | 7/1999 | Ho et al. | 372/92 |
| 6,239,893 B1 | * | 5/2001 | Bigo et al. | 359/176 |
| 6,323,979 B1 | * | 11/2001 | Bigo | 359/158 |
| 6,473,541 B1 | * | 10/2002 | Ho | 385/15 |

OTHER PUBLICATIONS

Nakamura et al., "168 Gbps Error–Free Demultiplexing With Hybrid–Integrated Symmetric Mach–Zehnder All–Optical Switch," Optical Fiber Conference 2000 Technology Digest, pp. 81–83, (Mar., 2000).
Sokoloff et al., "A Terahertz Optical Asymmetric Demultiplexer (TOAD)," IEEE Photonics Technology Letters, vol. 5, No. 7, pp. 787–790 (Jul., 1993).

(List continued on next page.)

Primary Examiner—Edward J. Glick
Assistant Examiner—Krystyna Suchecki
(74) Attorney, Agent, or Firm—Akin Gump Strauss Hauer & Feld, L.L.P.

(57) ABSTRACT

An optical device which monolithically integrates a variety of structures to route or demultiplex data. One or more ring resonators are used to couple a control signal into and out of a waveguide loop residing within the optical device. The device includes a waveguide loop interferometer, such as a Sagnac loop, and a nonlinear element, such as a semiconductor optical amplifier, inserted in the loop. A ring resonator removes the control signal from the waveguide loop after it passes through the nonlinear element. The control signal is removed via a path that is independent of paths used for managing the flow of data through the optical device. Data is selectively outputted from one of two output ports, depending upon the state of the nonlinear device, as determined by the control signal.

12 Claims, 7 Drawing Sheets

OTHER PUBLICATIONS

Kang et al., "Ultrafast Optical Time Demultiplexers Using Semiconductor Opticed Amplifiers," International Journal of High Speed Electronics and Systems, vol. 7, No. 1, pp. 125–151 (1996).

Glesk et al., "Demonstration of Ultrafast All–Optical Packet Routing," Electronics Letters, vol. 33, No. 9, pp. 794–795 (Apr., 1997).

Levy et al., "Fabrication of Ultracompact 3–dB 2×2 MMI Power Splitters," IEEE Photonics Technology Letters, vol. 11, No. 8, pp. 1009–1011 (Aug. 1999).

Chin et al., "Design and Modeling of Waveguide–Coupled Single–Mode Microring Resonators," Journal of Lightwave Technology, vol. 16, No. 8, pp. 1433–146 (Aug., 1998).

Lee et al., "Nonlinear Switching in an All–Semiconductor–Optical–Amplifier Loop Device," IEEE Photonics Technology Letters, vol. 11, No. 2, pp. 236–238 (Feb., 1999).

Lee et al., "Nonlinear Switching Behaviors in a Compact All–Semiconductor Optical–Amplifier Sagnac Interferometer Device," IEEE Journal of Quantum Electronics, vol. 35, No. 10, pp. 1469–1477 (Oct., 1999).

Studenkov et al., "Efficient Coupling in Integrated Twin–Waveguide Lasers Using Waveguide Tapers," IEEE Photonics Technology Letters, vol. 11, No. 9, pp. 1096–1098 (Sep., 1999).

* cited by examiner

MONOLITHIC INTEGRATED TERAHERTZ OPTICAL ASYMMETRIC DEMULTIPLEXER

BACKGROUND OF THE INVENTION

1. Field of the Invention

The present invention generally relates to an optical device, such as an interferometer, for routing or demultiplexing data.

2. Background Information

Conventional wavelength division multiplexing (WDM) systems efficiently use bandwidth in existing fiber-optic telecommunication infrastructures. Such systems provide point-to-point optical transmission at high aggregate rates (>100 Gb/s) without compromising on high performance. Future requirements of digital communication networks indicate that increased data-rate capacity is critical to a service provider's success in the market. Ultimately, all-optical networks will replace today's optical/electrical networks that suffer from the bottlenecking effects of optical-to-electrical-to-optical conversions due to the limited capacity of electronic devices. Devices that can optically process data without converting it to an electronic format are essential to this network capacity evolution.

Several forecasts have predicted that there will be a tremendous growth in the sensor market. In contrast to the classical sensors based largely upon the measurement of electrical parameters such as variable resistance or capacitance, modern sensors make use of a variety of novel phenomena. More importantly, these sensors are directly suitable for digital control and also have a degree of smartness incorporated in them to combat problems of nonlinearity and long term drift. Several key technologies are likely to play a major role in the sensors of the future. Microelectromechanical (MEM) sensors have tremendous potential as smart sensors. Fiber optics based sensors are also emerging as a viable and competitive technology. While many types of stand alone sensors are available, only some of them can be considered for integration with smart structures. Among these, fiber optic sensors are in the forefront in their choice for incorporation into materials and structures made of carbon and glass fiber reinforced polymer composites.

The advantages of fiber optic sensors (FOS) include freedom from EMI, wide bandwidth, compactness, geometric versatility and economy. In general, FOS is characterized by high sensitivity when compared to other types of sensors. FOS is also passive in nature due to the dielectric construction. Many signal processing devices (e.g., splitters, combiners, multiplexers, filters, delay lines) can also be made of fiber elements, thus enabling the realization of an all-fiber measuring system. Recently, photonic circuits (Integrated Optics) has been proposed as a single chip optical device or signal processing element which enables miniaturization, batch production, economy and enhanced capabilities.

A fiber optic sensor in general consists of a source of light, a length of sensing (and transmission) fiber, a photodetector, demodulation, processing and display optics and the required electronics. Interferometric (phase) sensors are based on the detection of changes in the phase of light emerging out of a single mode fiber. Interferometric fiber optic sensors are by far the most commonly used sensors since they offer the best performance.

Figure 1:
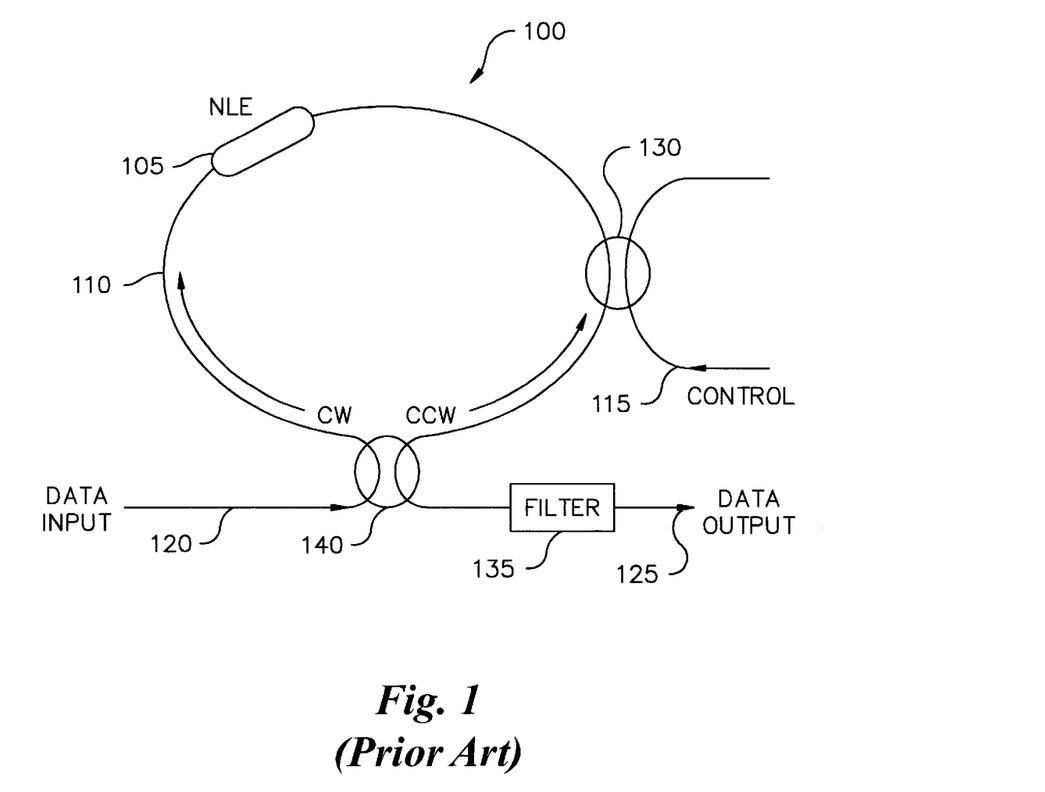
FIG. 1 shows a prior art Sagnac interferometer.

FIG. 1 shows a prior art Sagnac interferometer 100. Inside the interferometer, two counter propagating beams (one clockwise, CW, and another counterclockwise, CCW) arising from the same source, propagate along the same closed waveguide path 110. The CW and CCW beams are recombined in a quadrature coupler 140, where interference takes place. Data signals are thus selectively outputted from data output 125, depending upon the type of interference that occurs in quadrature coupler 140. The use of a terahertz optical asymmetric demultiplexer (TOAD) is based upon the concepts of a Sagnac interferometer. The TOAD has ultra-fast switching capabilities and is used to demultiplex an incoming data stream. All-optical digital bits are read for further signal processing or routing onto a particular path of an all-optical communication network. Prior art Sagnac loops have a single control port 115 for injecting the control signal via a coupler 130, typically made of fiber optic material. The control signal is used to control the state of a nonlinear element (NLE) 105 inserted in the waveguide path 110. The NLE is often a semiconductor optical amplifier (SOA). Data is inputted via an input data port 120 and outputted via an output port 125. The control signal is eliminated at the output by inserting a polarization or wavelength filter 135.

One deficiency with prior art TOADs is that the physical size of the coupler 130 and the material used to make the coupler 130 makes such TOADs unsuitable for monolithic fabrication. Accordingly, there is an unmet need for a monolithically integrated TOAD to keep size down to a minimum without affecting performance.

Another deficiency with prior art TOADs is that they do not provide a smooth transition for signals to be inputted into and outputted from an integrated structure. Accordingly, there is an unmet need for monolithically integrating the structures of the TOAD so as to ease the device to fiber alignment and thus enhance the coupling efficiency of light into and out of the device.

Yet another deficiency with prior art TOADs is that all or part of the control signal is outputted along with the switched (demultiplexed) data signal, thus requiring filtering and/or complicated processing techniques at or past the output. Accordingly, there is an unmet need for a TOAD wherein inputted control signals are removed once they pass through the nonlinear device inserted in the waveguide loop, but before the control signals reach the data output of the TOAD.

BRIEF SUMMARY OF THE INVENTION

The present invention provides for the use of a ring resonator as a coupler to provide a separate input and output for a clocking control signal. The control signal is coupled into and out of the optical device without perturbing its geometry. By providing independent input and output ports for the control signal, filtering and/or other complicated processing techniques at the output of the device can be avoided.

The present invention also provides for the monolithic integration of a variety of optical device structures, which together will produce superior performance and increased utility over the prior art. In the present invention, asymmetric twin waveguide structures are integrated at all transitions to the "outside world" such as connections to external fiber or other optical waveguide components.

Another embodiment of the present invention also provides the addition of a ring resonator as a coupler to route the data signal from the device once it is switched from a first path to a second path.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DESCRIPTION OF THE INVENTION

1. Overview

Figure 2:
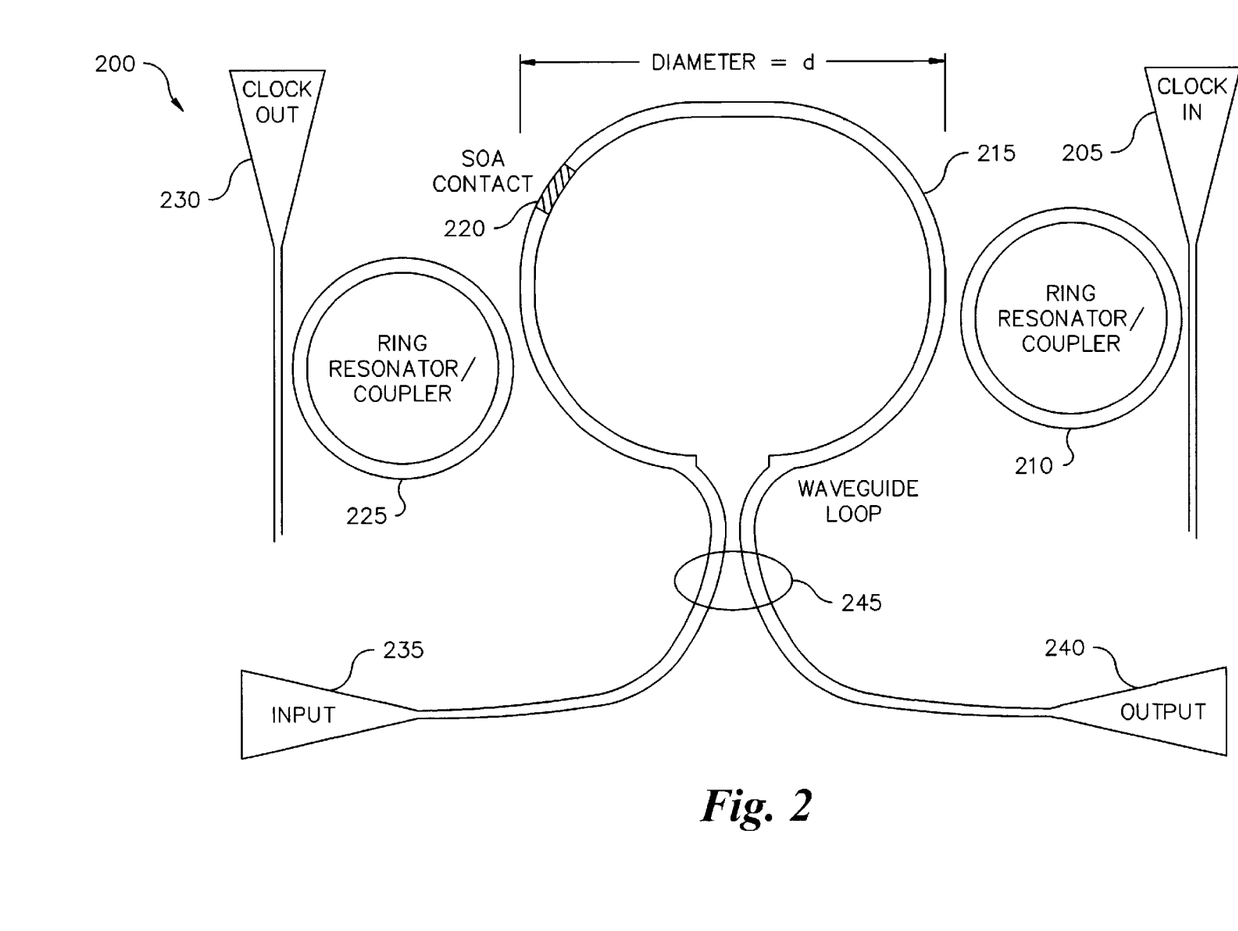
FIG. 2 shows an integrated TOAD device in accordance with the present invention.

FIG. 2 shows an optical device 200 for routing or demultiplexing data in accordance with the present invention. The optical device 200 comprises a waveguide loop 215 having a nonlinear element 220 inserted in the waveguide loop 215 and a waveguide transition 205 through which a control (clock) signal is injected. The control signal determines the state of the nonlinear element 220. The nonlinear element may be an SOA. A data stream is inputted via waveguide transition 235 and outputted via waveguide transition 240. A ring resonator 210 couples the control signal injected through waveguide transition 205 into the waveguide loop 215. The optical device 200 may also comprise a second ring resonator 225 which couples the control signal out of the waveguide loop 215 after the control signal passes through the optical amplifier 220. The optical device may also comprise a waveguide transition 230 which receives the control signal from the second ring resonator 225. The ring resonators 210 and 225 may be tuned to the wavelength of the control signal.

The components within the optical device 200 may be monolithically integrated. The waveguide transitions 205 and 230 may be comprised of a first waveguide closely coupled to a substantially wider second waveguide.

The optical device 200 may be an interferometer. The interferometer comprises a Sagnac loop which includes the waveguide loop 215 and a quadrature coupler 245, such as a multimode interference (MMI) device. The ring resonator 210 injects the control signal into the waveguide loop 215.

The interferometer may also comprise a second ring resonator 225 which couples the control signal out of the waveguide loop 215 after the control signal passes through the nonlinear element 220 inserted in the waveguide loop 215. The nonlinear element may be an SOA. The ring resonators 210 and 225 may be tuned to the wavelength of the control signal. The components within the interferometer may be monolithically integrated.

The optical device 200 may also be monolithically integrated for routing or demultiplexing data. The optical device 200 comprises a waveguide loop 215 including a nonlinear element 220, the first ring resonator 210 which couples the clock signal into the waveguide loop 215 and the second ring resonator 225 which couples the clock signal out of the waveguide loop 215 after the clock signal passes through the nonlinear element 220 and an MMI quadrature coupler 245. The clock signal controls the state of the nonlinear element 220.

The monolithically integrated optical device may further comprise the waveguide transition 205 for inputting the clock signal to the first ring resonator 210 and the second waveguide transition 230 for receiving the clock signal from the second ring resonator 225. The first and second ring resonators 210 and 225 maybe tuned to the wavelength of the clock signal. The first and second waveguide transitions 205 and 230 may each be comprised of a first waveguide closely coupled to a substantially wider second waveguide. The monolithically integrated optical device 200 has a waveguide transition 235 for receiving data and a waveguide transition 240 for outputting data.

The optical device 200 may be used to carry out a method for routing or demultiplexing data via a first path. The control signal is injected into the waveguide loop via a second path. The control signal is removed from the waveguide loop via a third path after the control signal passes through the nonlinear element 220. The second and third paths are independent of the first path.

The control signal may determine the state of the nonlinear element. The first path may include the waveguide transitions 235 and 240. The second path may include the waveguide transition 205 and the ring resonator 210. The third path may include the ring resonator 225 and the waveguide transition 230.

The optical device 200 may be used for routing or demultiplexing data via a data path. The optical device 200 includes the waveguide loop 215. The optical device 200 also includes the ring resonator 210 and waveguide transition 205 which serve as an input port for injecting the control signal into the waveguide loop 215. The optical device 200 also includes ring resonator 225 and transition waveguide 230 which serve as an output port for removing the control signal from the waveguide loop after the control signal passes through the nonlinear element 220. The input and output ports are independent of the data path. The nonlinear element may be an SOA. The optical device 200 may be a Sagnac interferometer.

Figure 3:
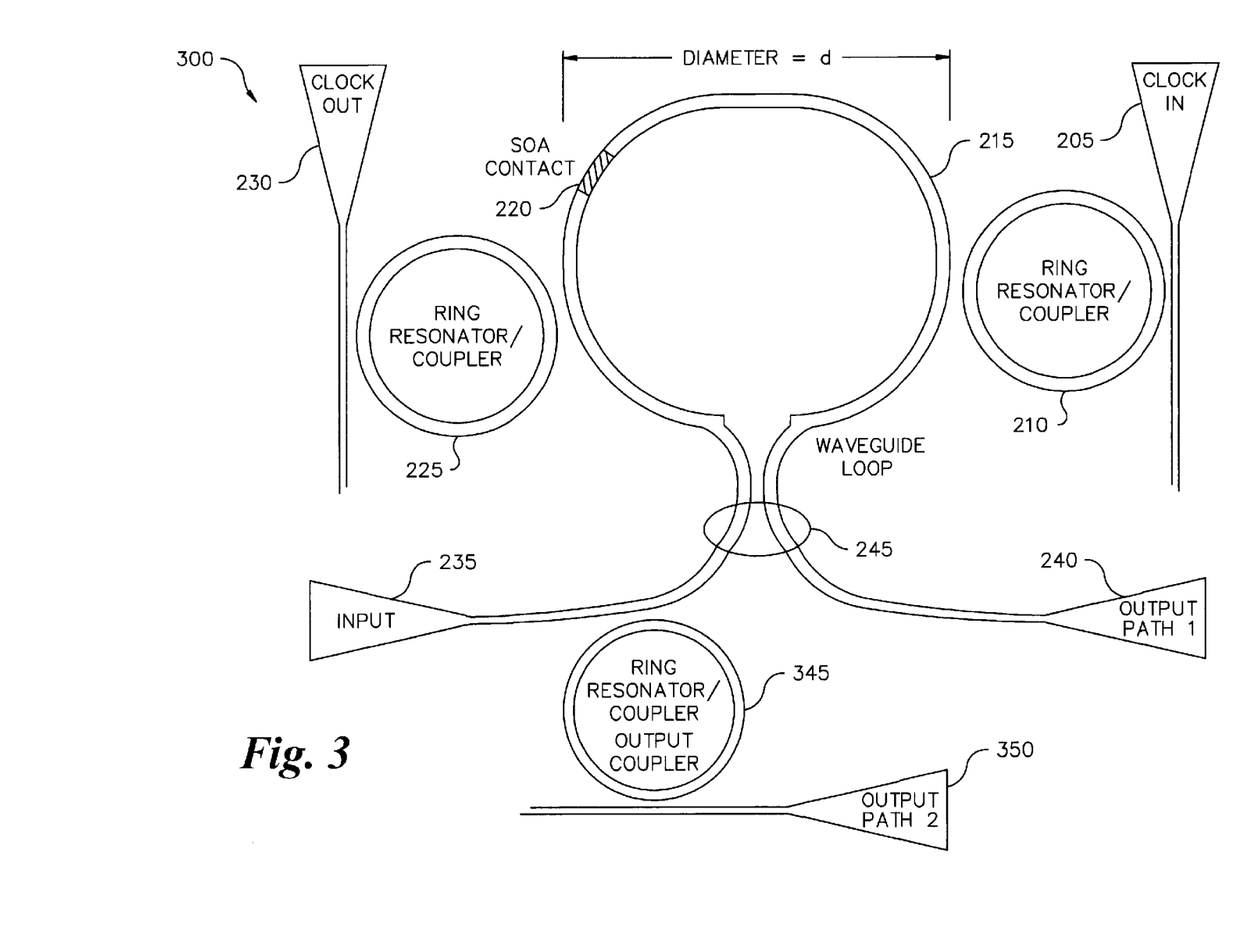
FIG. 3 shows an integrated all-optical routing switch in accordance with the present invention.

FIG. 3 shows a monolithically integrated optical device 300 for routing or demultiplexing data in accordance with the present invention. The optical device 300 is similar to that shown in FIG. 2, with the exception that the optical device 300 has an additional ring resonator 345 and a waveguide transition 350 which provides an alternative data output. When the nonlinear element 220 is in a first state, data is outputted via the waveguide transition 240. When the nonlinear element 220 is in a second state, the ring resonator 345 couples the data to the waveguide transition 350.

2. Detailed Description

Referring again to FIG. 2, the present invention is used to read/demultiplex or route/switch a single bit or a stream of bits being transmitted in an all-optical digital format. The optical device 200 takes advantage of the extremely short period of time that it takes for the nonlinear element 220 to saturate. During the interval of time that the nonlinear element 220 is saturated, the index of refraction of the semiconductor material is different from the steady-state value. Thus, an optical wave propagating through the nonlinear element 220 during a period of time when the optical device 200 is in a saturated state will move at a different velocity that it would ordinarily transit had it been within the device while it was in a normal steady-state condition. This difference in velocity due to the saturation condition implies a difference in travel time through the optical device 200 which, in turn, translates into a phase difference that is used to create both destructive and constructive interference effects. The coherent wave interference phenomena can be controlled in a very fast, yet precisely timed manner, to achieve the desired functionality of the devices described herein. The control comes about via the application of an optical clock pulse which is timed in a manner so as to effect the nonlinear element 220 saturation condition during the interval of time when the optical bits need to be demultiplexed, for further signal processing, or switched onto another path for routing in network transmissions.

The particular realization of the optical device 200 discussed in this disclosure is built-up using an assembly of unique structures that are fabricated on a semiconductor wafer during a monolithic processing sequence. The optical device 200 may be a TOAD.

At the interfaces to external optical connections are the asymmetric twin-waveguide transitions 205, 230, 235, 240 that provide an efficient means to couple light into and out of the semiconductor waveguide devices, which comprise the optical device 200. The asymmetric twin waveguide provides a wide aperture to feed light from or to a single mode fiber optic line. The wide aperture allows for easier alignment of the fiber to the device's optical ports. This transition also provides a means of transforming the optical fiber modes into the semiconductor waveguide modes in a graceful fashion.

The ring resonator 210 is used as a means to inject the clocking control signal onto the main waveguide loop. The ring resonator 210 is tuned to the clock wavelength so that maximum coupling into the main loop occurs. Because the ring resonator is a proximity type device, its presence does not disturb the geometry of the main waveguide loop. The ring resonator can essentially be located at any convenient position around the circumference of the main loop. Furthermore, the wavelength resonant properties of the ring resonator can be used as a filter to remove the clock signal from the output data stream once the switching or demultiplexing function is accomplished. In this case, ring resonator 225 is placed along the outside of the main waveguide loop 215 and specifically tuned to the clock wavelength so that this signal can be decoupled from the main waveguide loop 215 once it has passed through the nonlinear element 220 and saturated the device.

Referring again to FIG. 3, the particular realization of the monolithically integrated optical device 300 discussed in this disclosure is also built-up using an assembly of unique structures that are fabricated on a semiconductor wafer during a monolithic processing sequence. At the interfaces to external optical connections are waveguide transitions 205, 230, 235, 240, 350 that provide an efficient means to couple light into and out of the semiconductor waveguide devices, which comprise the monolithically integrated optical device 300. The waveguide transitions are asymmetric twin-waveguide transitions which provide a wide aperture to feed light from or to a single mode fiber optic line. The wide aperture allows for easier alignment of the fiber to the device's optical ports. This transition also provides a means of transforming the optical fiber modes into the semiconductor waveguide modes in a graceful fashion. A ring resonator 345 may be used such that monolithically integrated optical device 300 is set-up with two output ports consisting of waveguide transitions 240, 350 so that it can be used as a routing switch to perform all-optical signal routing.

In this case, the ring resonator 345 would be used to couple the "Output Path 2" signal from the monolithically integrated optical device 300 onto the output arm which includes waveguide transition 350.

Referring again to FIG. 3, the main waveguide loop 215 is composed of a semiconductor optical waveguiding structure with active layers that can be pumped electrically to form a semiconductor optical amplifier section. Ohmic contact metalization is deposited on and in the vicinity of an arc section of the loop to form the nonlinear element active segment. A DC bias voltage is applied to the nonlinear element 220 to invert the carrier population in this region of the loop.

The entire optical device should take up approximately 1 mm×1 mm on a semiconductor wafer. The diameter d of the waveguide loop may be <0.600 mm and the length of the waveguide transitions may be <0.125 mm. Thus, a 2 cm×1 mm chip could hold an array of up to 20 devices for switching and demultiplexing in dense wavelength division multiplexing (DWDM) digital optical communication networks. The device may be implemented in III–V semiconductor material with heterostructure layers consisting of materials such as, but not limited to, $In_xGa_{1-x}As_yP_{1-y}$ (indium gallium arsenide phosphide), or $Al_xGa_{1-x}As$ (aluminum gallium arsenide) grown monolithically on either an InP (indium phosphide) or GaAs (gallium arsenide) substrate. A variety of techniques can be used during the fabrication sequence to form the essential structures of the device including the use of inductively coupled reactive ion beam etching to produce extremely vertical sidewalls on all of the waveguiding structures, including the ring resonator. Methods for growing and fabricating the asymmetric twin waveguide coupler have been reported in the literature. The preferred technique is a unique method that allows the device to be fabricated without the need for epitaxial regrowth. See, for example, "Efficient Coupling in Integrated Twin-Waveguide Lasers Using Waveguide Tapers," by Studenkov et al.

Figure 4:
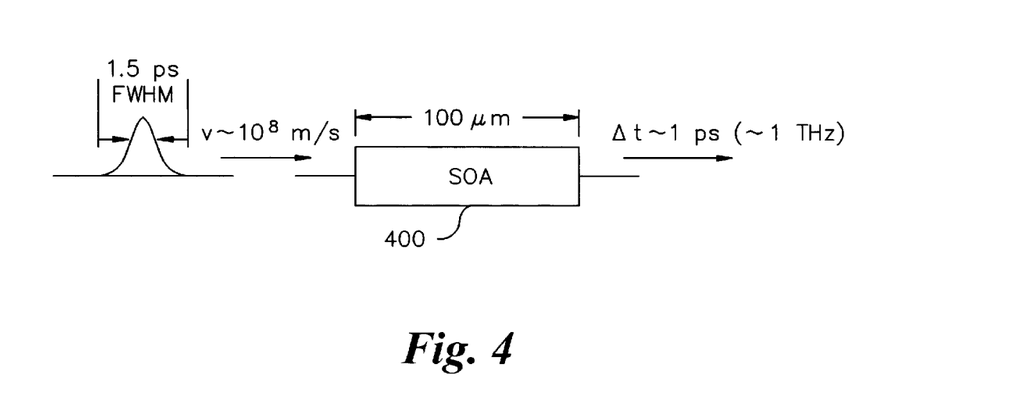
FIG. 4 shows a basic SOA transient operation in accordance with the present invention.

FIG. 4 illustrates the basic transient operation of an SOA 400 is illustrated. The SOA 400 will saturate and the carrier population depletion will be completed within about 1 ps ($\cong 1$ THz) from the time that the control (clock) pulse wavefront (full-width half-maximum (FWHM)$\cong 1.5$ ps) enters the SOA 400.

Figure 5:
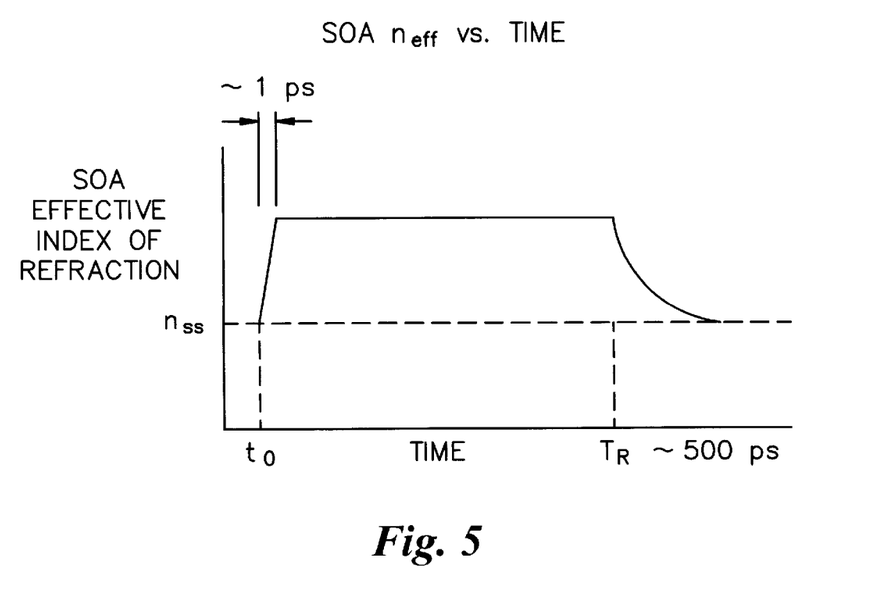
FIG. 5 shows the SOA's switching speed in accordance with the present invention.

FIG. 5 illustrates the SOA index of refraction over a period of time. The SOA will remain saturated for an extended period of time until it relaxes back to its steady-state condition of population inversion due to electrical pumping. The SOA has an extremely fast initial switching time due to the purely optical nature of the interaction. The relaxation takes about $T_R = 500$ ps (=2 GHz). The delay in the restoration of the steady-state pumped condition can be substantially reduced (to only a few ps) by optically pumping the device. The recovery ($T_R$) back to its steady state is a much slower process because it is normally an electrical/statistical thermodynamic phenomenon. Applying an optical pump can speed up the recovery time.

Figure 6:
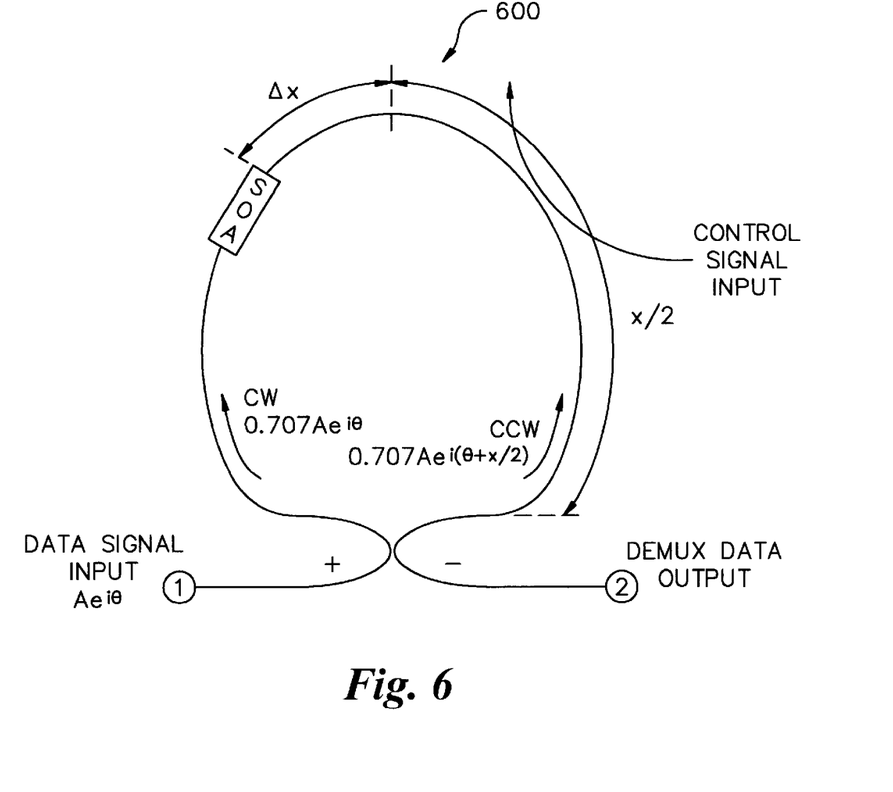
FIG. 6 shows the operation of the TOAD in accordance with the present invention.

FIG. 6 illustrates the configuration and operation of a TOAD 600. The TOAD 600 is an interferometric device that effectively removes the undesirable slow recovery time of the SOA from the switching action. The switching window is set by placing the SOA a distance $\Delta x$ from the midpoint of the loop (x/2). The signal interference occurs, between clockwise (CW) and counter-clockwise (CCW) signals, propagating around the loop, in a quadrature hybrid coupler that imparts phase shifts of $\pi/2$ onto the waves emanating from its diagonal ports. During intervals of time when the CW and CCW signals encounter the SOA in the same optical state, destructive interference will occur at port 2 and there will be no output signal at this port. However, exactly the opposite will be true at port 1. Constructive interference will occur and an output signal (traveling in the opposite direction as the input signal) will appear on this port. When the CW ($0.707Ae^{i\theta}$) and CCW ($0.707Ae^{i(\theta+\pi/2)}$) signals encounter the SOA in the same optical state, $0.5Ae^{i(\theta+\pi/2+\pi/2)} + 0.5Ae^{i\theta} = 0$. When the CW and CCW signals encounter the SOA in different optical states, $0.5Ae^{i(\theta+\pi/2+\pi/2)} + 0.5Ae^{i\theta} = Ae^{i\theta}$. It is noted that output signals appear on port 1 under exactly the opposite conditions that produce output signals on port 2 of the TOAD. Thus, the TOAD can also act as a routing device. During time intervals when the CW and CCW signals encounter the SOA in two different optical states, constructive interference will occur at port 2 and a null is found on port 1 output. Thus, an output appears on port 2 and a null is found on port 1. The state of the SOA is changed by injecting a precisely timed control signal of sufficient power so as to deplete the SOA of carriers in its population inverted conduction band. In particular, the control signal is injected after the CW signal passes through the SOA but before the CCW signal reaches it. Furthermore, the control signal should ideally modify the SOA's optical properties enough so that the CCW signal experiences an additional phase shift of $\pi$ radians with respect to the CW signal for complete constructive interference at port 2. The interferometer configuration of the TOAD removes the dependence on the slow recovery time and allows for extremely fast switching rates. 640 GigaBit/sec has been demonstrated in the laboratory. The TOAD can act as an optical AND gate, an optical demultiplexer, or an optical routing switch.

Figure 7:
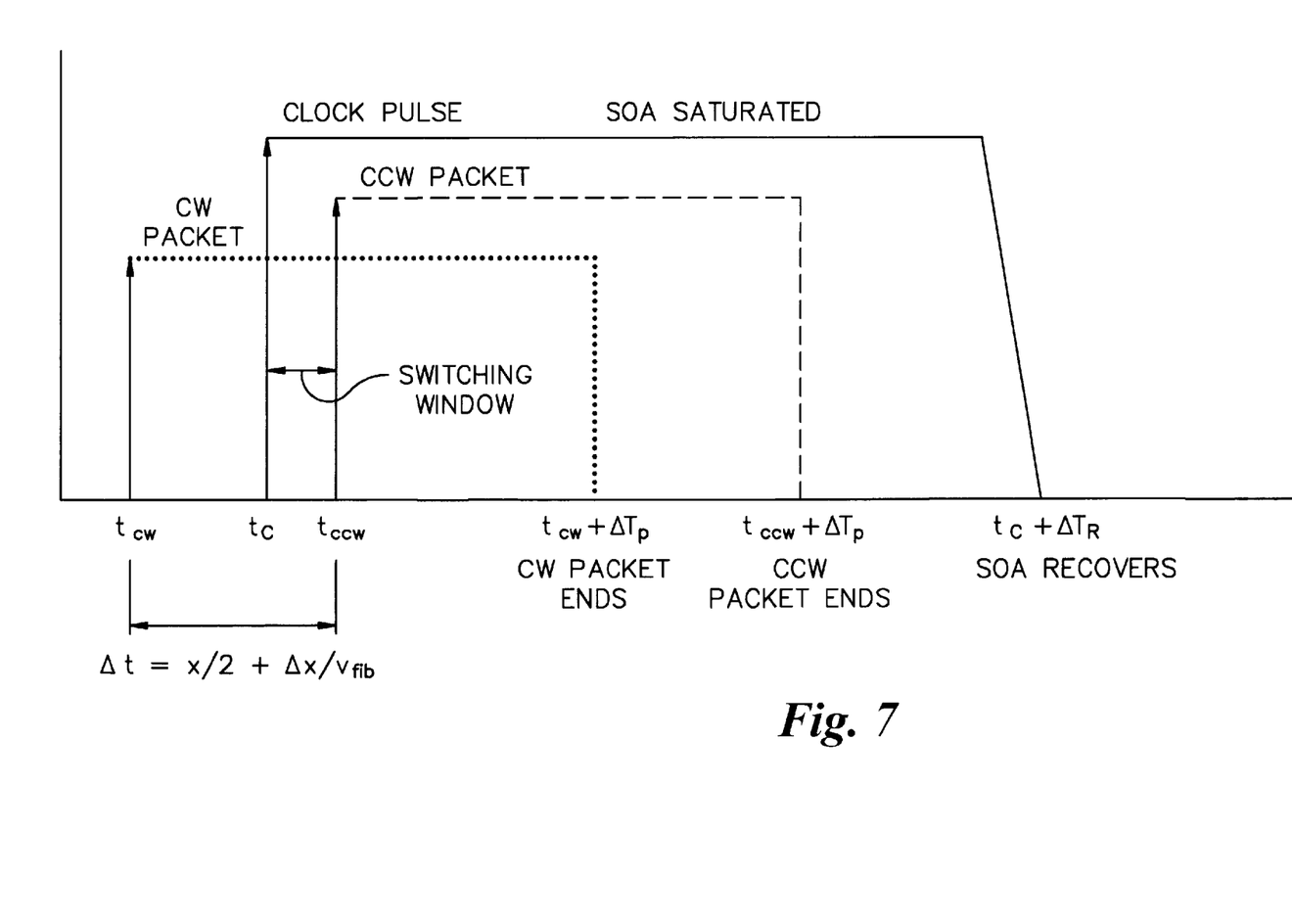
FIG. 7 is a timing diagram of the TOAD as shown in FIG. 6.

FIGS. 6 and 7 illustrate how the demultiplexing and switching functions of the present invention operate. The following parameters are defined:

x/2 the distance from a data port (input or output) to the loop midpoint $\Delta x$=the SOA offset distance from the loop midpoint (see FIG. 6)

$V_{fib}$=the velocity of the waves in the fiber $\Delta_\tau$=offset time=$\Delta x/V_{fib}$ $t_{ccw}$=time the CW signal reaches the SOA facet $t_{ccw}$=time the CCW signal reaches the SOA facet=$\Delta\tau+(x/2)/V_{fib}$ $t_c$=time the clock (control) pulse reaches the SOA facet $\Delta T_p$=Data Packet Duration $\Delta T_B$=Single Bit Duration=1/data rate $\Delta T_R$=SOA recovery time In a first case: $t_{ccw} < t_{cw}+\Delta T_p$;

$t_{cw} \leq t_c < t_{ccw}$ and $\Delta T_R > t_{ccw}+\Delta T_p$

For $t_{cw} < t < t_c$: output to port 2

For $t \geq t_c$: output to port 2

If $t_c - t_{cw} = \Delta T_B$, then a single bit is demultiplexed to port 2. To pick a specific bit set, $t_{cw}$ must=$t_{Bn}$, where $t_{Bn}$ is the time the $n^{th}$ bit reaches the SOA on the CW path.

In a second case: $t_{ccw} \geq t_{cw}+\Delta T_p$;

$t_{cw} < t_c < t_{ccw}$; and $\Delta T_R > t_{ccw}+\Delta T_p$

For $0 < t < t_c$: output to port 2

For $t > t_c$ output to port 1

In a third case: $t_{ccw} \geq t_{cw}+\Delta T_p$;

$t_c = t_{ccw}$; and $\Delta T_R > t_{ccw}+\Delta T_p$

For $0 < t < t_c$: entire packet switched to port 2

For $t \geq t_c$: N/A

The present invention may be used as an integral component in all-optical digital communications network equipment. Such netwvorks will not suffer from the typical optical-to-electrical-to-optical bottlenecking conversions of conventional systems. The present invention provides the ability to route or read individual bits or groups of bits being transmitted in an all-optical digital data format. The present invention can play a vital role in implementing extremely high data-rate (>40 GB/s) packet or bursty (IP) systems. Furthermore, the present invention may be used in fiber-to-the-home/business applications where all-optical data routing or demultiplexing will be required in the network. The technology allows for the advancement in data capacity because it can operate over an extremely wide range of data rates from a few MB/s to hundreds of GB/s. The present invention represents an essential component in an enabling technology that will lead the way in making high data-rate and high capacity networks an economically feasible venture. Since the present invention can be implemented using semiconductor chip processing technology, its cost may ultimately fall into a range where it is inexpensive enough to be inserted, in multiples, at nodes, minimodes, headend switching points, or fiber-to-the-home/fiber-to-the-building (FTTH/FTTB) utility boxes used in all-optical communication networks. One only needs to provide a short pulse optical source whose repetition rate can be set to the data rate of the current state-of-the-art requirements.

The present invention may be used in the test and measurement instrumentation associated with all-optical digital data communication networks. The present invention may also find applications in scientific research or medical applications where ultra-short optical pulses are used to analyze tissues or other matter.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A monolithically integrated optical device for routing or demultiplexing data, comprising:

(a) a waveguide loop including a nonlinear element and a quadrature coupler connected at clockwise (CW) and counterclockwise (CCW) propagating ends of the waveguide loop;

(b) a first input port for inputting data into the waveguide loop;

(c) a second input port for injecting a control signal into the waveguide loop, the control signal determining the state of the nonlinear element;

(d) a first output port for outputting data when the nonlinear element is in a first state; and (e) a second output port for outputting data when the nonlinear element is in a second state, wherein the second output port is independent of the waveguide loop, and the first input port is directly connected to the quadrature coupler.

2. The optical device of claim 1 further comprising:

(f) a first ring resonator for coupling data from the waveguide loop to the second output port.

3. The optical device of claim 2 further comprising:

(g) a second ring resonator tuned to the wavelength of the control signal, the second ring resonator coupling the second input port to the waveguide loop.

4. The optical device of claim 3 further comprising:

(h) a third output port for removing the control signal from the waveguide loop after the control signal passes through the nonlinear element.

5. The optical device of claim 4 further comprising:

(i) a third ring resonator tuned to the wavelength of the control signal, the third ring resonator coupling the third output port to the waveguide loop.

6. The optical device of claim 1 wherein the optical device is a Sagnac interferometer.

7. The optical device of claim 1 wherein the nonlinear element is a semiconductor optical amplifier (SOA).

8. A method for controlling the characteristics of a monolithically integrated optical device, the optical device including (i) a waveguide loop, (ii) a nonlinear element which is inserted in the waveguide loop, and (iii) a quadrature coupler connected at clockwise (CW) and counterclockwise (CCW) propagating ends of the waveguide loop, the optical device being used for routing or demultiplexing data, the method comprising:

(a) inputting data into the waveguide loop via a first input port of the optical device;

(b) injecting a control signal into the waveguide loop via; a second input port of the optical device, the control signal determining the state of the nonlinear element;

(c) outputting data when the nonlinear element is in a first state via a first output port; and (d) outputting data when the nonlinear element is in a second state via a second output port, wherein the second output port is independent of the waveguide loop, and the first input port is directly connected to the quadrature coupler.

9. The method of claim 8 wherein step (a) further comprises:

(a1) coupling the first input port to the waveguide loop via a first ring resonator.

10. The method of claim 9 wherein step (b) further comprises:

(b1) coupling the second input port to the waveguide loop via a second ring resonator tuned to the wavelength of the control signal.

11. The method of claim 10 further comprising:

(e) removing the control signal from the waveguide loop via a third output port after the control signal passes through the nonlinear element.

12. The method of claim 11 wherein step (e) further comprises:

(e1) coupling the third output port to the waveguide loop via a third ring resonator tuned to the wavelength of the control signal.

* * * * *

UNITED STATES PATENT AND TRADEMARK OFFICE
CERTIFICATE OF CORRECTION

PATENT NO.    : 6,671,426 B2
DATED         : December 30, 2003
INVENTOR(S)   : Kerry I. Litvin It is certified that error appears in the above-identified patent and that said Letters Patent is hereby corrected as shown below:

<u>Column 7,</u>
Line 45, "$t_{ccw}$=time" should read -- $t_{cw}$=time --.

Signed and Sealed this

Thirteenth Day of April, 2004

JON W. DUDAS
*Acting Director of the United States Patent and Trademark Office*